June 9, 1959 W. B. LLOYD 2,889,815
PRESSURE FEEDBACK SERVO VALVE
Filed July 20, 1956 2 Sheets-Sheet 1

INVENTOR
Wayne B. Lloyd

United States Patent Office 2,889,815
Patented June 9, 1959

2,889,815

PRESSURE FEEDBACK SERVO VALVE

Wayne B. Lloyd, Catonsville, Md., assignor to Westinghouse Electric Corporation, East Pittsburgh, Pa., a corporation of Pennsylvania Application July 20, 1956, Serial No. 599,157

1 Claim. (Cl. 121—46.5)

This invention relates to a fluid control valve and, more particularly, to a two-stage fluid flow control valve providing pressure feedback stabilization.

Hydraulic servo valves of the type here under consideration generally comprise a valve having a pressure port connected to a source of hydraulic pressure, two ports connected to opposite sides of a piston or a similar work device, and at least one drain port connected to a sump or other accumulator associated with the fluid flow pressure source. Such devices are described in the article "Electro-Hydraulic Servo Systems" by D. G. O'Brien and R. D. Atchley appearing in Electrical Manufacturing of April 1954, pages 89–96. A movable valve element, or spool, within the valve chamber gates the flow of hydraulic fluid from the pressure port to one or the other of the work ports and from the work port to which fluid pressure is not applied to one of the drain ports. The work port to which the hydraulic pressure port is coupled is determined by moving the spool in one direction or the other from a given central position. At page 95 of the aforementioned article, there is described a servo valve, the movement of the spool of which is controlled by metering the flow of fluid from a chamber associated with one end of the spool. The fluid pressure in the chamber is balanced by a spring which exerts biasing pressure against the opposite end of the spool. The fluid flow from the chamber is controlled by a spring biased flapper or vane type valve, the relative position of which, with respect to an orifice opening into the chamber, is controlled by electromagnetic means associated therewith.

When valves of this type are used in control systems involving a closed loop (that is, output response being used to alter system input control), the natural frequency of the valve response may impose a serious problem on the stability of the system. Invariably, the valve attempts to make immediate response to the levels of input control selection causing the valve to overcontrol and oscillate to its selected or desired input level. These oscillations may cause a closed loop system utilizing the value, to become unstable and thus be inoperative.

Several methods of compensation for closed loop instability have been previously attempted. One method is to underlap the valve; that is, make the lands of each spool of less length with respect to its associated openings, such that the passages are constantly open, allowing limited hydraulic fluid flow. This system, however, has the disadvantage of wasting hydraulic fluid and hence power while the valve is in the neutral or standby condition. This system additionally lowers the valve pressure gain since the amount of actuator differential pressure per unit of spool displacement is lowered.

Another way to control the oscillations of servo-valves used in conjunction with inertia loads is to introduce slippage or internal leakage into the controlled work actuator. This type of damping of oscillations is poor since its effectiveness changes with temperature changes. Another disadvantage is that fluid flow occurs whenever torque is produced, hence there is a power loss and a reduction in pressure gain.

In practicing this invention, a two-stage servo-control valve is provided. The first stage provides oppositely variable pressures for the control of the second stage, which in turn provides working fluid pressures to a work actuator. The second stage is a control spool valve which is displaced in response to the first stage supplied oppositely variable pressures. The spool valve is also provided with a work actuator pressure feedback control capable of opposing the spool valve initial displacement sufficiently to prevent the work actuator from passing the velocity demanded by the first stage actuator, due to load inertia and fluid compressibility.

It is, therefore, an object of this invention to provide a servo-control valve having pressure feedback control allowing the valve to have rapid response without overcontrol oscillations.

It is an additional object of this invention to provide a servo valve having good stability while maintaining leakage to a minimum.

Another object of this invention is to provide a servo valve of good response and good regulation that is not affected by temperature changes.

Still another object of this invention is to provide a hydraulic servo valve that is relatively simple to construct and to maintain.

Other objects and features will be apparent from consideration of the following description of this invention when taken with reference to the accompanying drawing, wherein.

Similar parts are designated by like reference characters in each of the several views.

Figure 1:
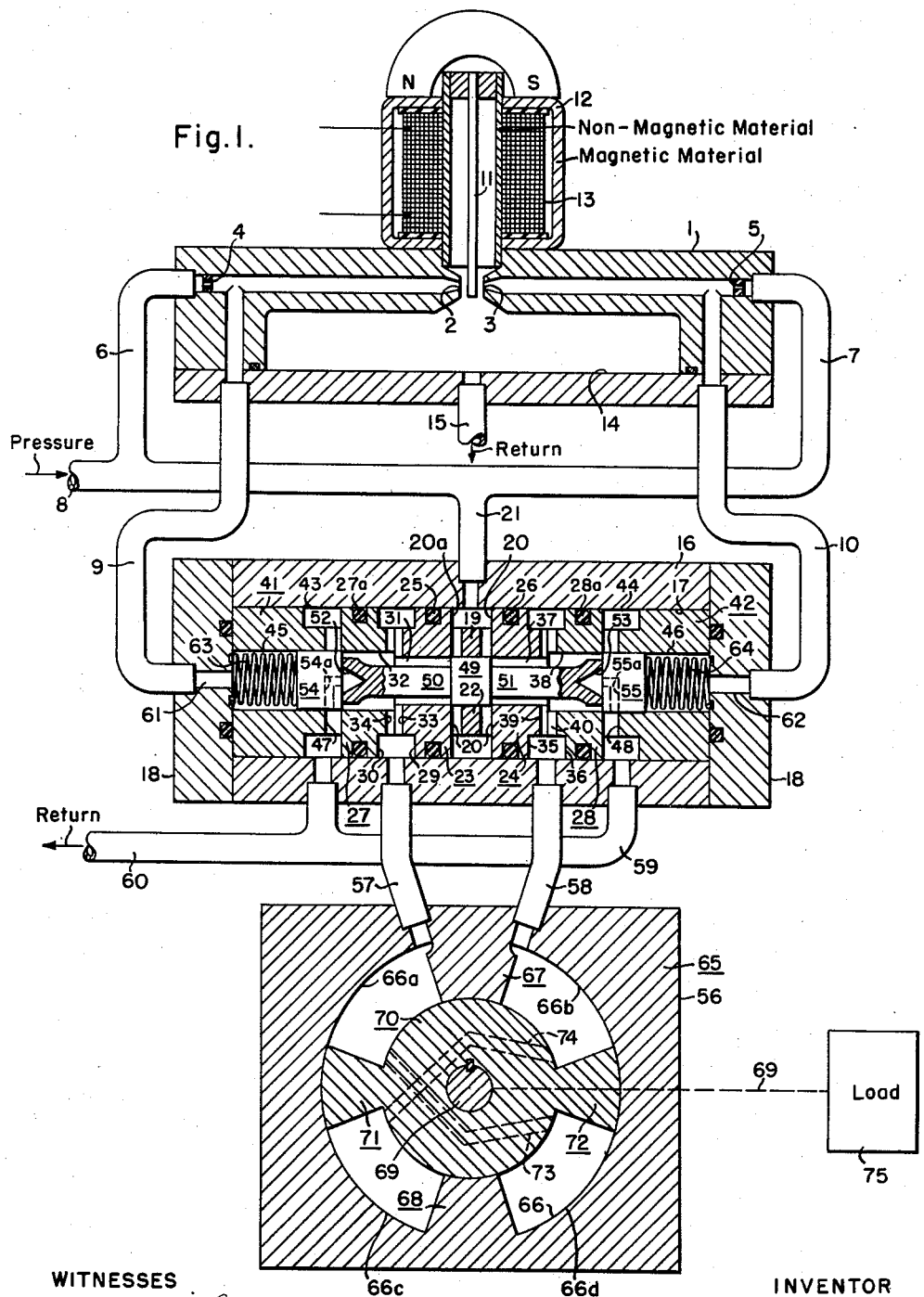
Figure 1 is a view of a preferred embodiment of this invention partly sectioned to better illustrate the structure.

Referring first to Figure 1, the servo valve of this invention involves two stages. The first stage is used to regulate incoming hydraulic fluid pressures proportional to control currents supplied from a remote location (not shown). The first stage output pressures are then applied to the second stage comprising a control valve which, in turn, controls fluid flow and pressures to a work actuator.

The first stage comprises a valve body 1 provided with a pair of orifices 2 and 3 placed in spaced-apart close relationship and in opposing positions. The two orifices are provided with fluid flow through restricted flow control openings 4 and 5, respectively. The restricted openings 4 and 5 are connected through the pipes 6 and 7 to a common source pipe 8 supplied by a suitable source of fluid, not shown. Connected to the pressure pipe at a point between the restricted opening 4 and the orifice 2 is a second stage control pipe 9; likewise between the opening 5 and the orifice 3 is the second stage pressure control 10.

Positioned midway between the orifices 2 and 3 is a fluid control vane 11 biased to the mid-point by its own resilience and supported on the magnetic structure 12 of a torque motor control winding 13 which is controlled from some remote location (not shown). Operation of the magnetic structure controlling the fluid control vane 11 is explained in detail in the application to Mark I. Place, Serial No. 502,471, filed April 19, 1955, now Patent No. 2,824,574, issued February 25, 1958, and entitled "Hydraulic Servo-Valve," which application is assigned to the assignee of this application. It is considered sufficient for the purposes of this application to state that the control vane 11 is moved in one direction or the other in response to current flow in one direction or the other in the coil 13.

Fluid flowing from the orifices 2 and 3 is emptied into a chamber 14 in the valve body 1 and exhausted through a return pipe 15 to an accumulator (not shown).

A brief explanation of the operation of the first stage will now be presented to better illustrate the response pressures supplied to the second stage. Under conditions of no current flow, it can be seen that fluid from the main supply pipe 8 flows through the supply pipes 6 and 7, the restricted openings 4 and 5 and orifices 2 and 3 in equal portions and into the chamber 14 and return pipe 15. Under these conditions it can be seen that pressure supplied to the pressure supply pipes 9 and 10 feeding the second stage would be equal.

If we assume that a current of one polarity is supplied to the control winding 13 deflecting the vane 11 in one direction, say to the left of the center position shown in the drawing, flow from the orifice 2 is restricted by the vane 11; while at the same time, flow from the orifice 3 is relieved by the vane 11. It is apparent, therefore, that under these conditions, and the limited fluid flow through the openings 4 and 5, the pressure in the supply pipe between the restricted opening 4 and the orifice 2 will increase while the pressure between the opening 5 and the orifice 3 will decrease. The effects of the pressure changes will be felt in the second stage supply pipes 9 and 10 with the increase in pressure being felt in the pipe 9 and the decrease in pressure being felt in the pipe 10.

It should be clear that if the current supplied to the winding 13 had been in the reverse direction, the vane 11 would have been deflected in the opposite direction, causing a restriction of the orifice 3 and a relief of the orifice 2. It is apparent, therefore, that under these conditions the pressure in the supply pipe 10 to the second stage would increase, while the pressure in the supply pipe 9 to the second stage would decrease.

The changes in pressure within the supply pipe 9 and 10 is proportional to the changes in current supplied to the winding 13 controlling the fluid flow vane 11.

A description of the second stage is set forth in the following paragraphs:

The second stage comprises a body portion 16 having a longitudinal horizontal bore or opening 17 and end sealing caps 18. Inserted into the opening 17 are a plurality of valve guides and spacers. Centrally positioned within the opening 17 is a spacer 19 provided with radially extending openings 20. The openings 20 are used to provide passage for fluid from the supply pipes 8 and 21 cooperating with a peripheral opening 20a (formed by the spacer 19) into a central opening or bore 22 within the spacer 19. Positioned on opposite sides of the spacer 19 and secured thereto, by any suitable means such as welding or brazing, are a pair of valve guides 23 and 24. The valve guides 23 and 24 are provided with fluid flow sealing devices 25 and 26, respectively, to prevent fluid leakage past the outer peripheral edges of the valve guides 23 and 24. Positioned adjacent to and to the right and left of the valve guides 23 and 24, as viewed in the drawing, are the valve guides 27 and 28, respectively. Valve guides 27 and 28 are also provided with peripheral fluid flow seals 27a and 28a, respectively. The valve guides 23 and 27 when placed in proper position are provided with adjacent cut-away portions 29 and 30, respectively. The cut-away portions 29 and 30 form a peripheral opening that is interconnected with valve guide central openings or bores 31 and 32 by radial passages 33 and 34, respectively.

Likewise, valve guides 24 and 28 when placed in proper position are provided with adjacent notches 35 and 36, respectively, forming a peripheral opening or fluid flow cavity. This cavity is similarly connected to the central openings or bores 37 and 38 of the respective valve guides 24 and 28 through radial openings 39 and 40, respectively.

The valve guide 23 is positioned in firm contact with the valve guide 27, and the guide 24 is positioned in firm contact with the guide 28.

The valve guides 27 and 28 are secured by any suitable means, such as welding, to the valve guides 41 and 42, respectively. The valve guides 41 and 42 when in position provide an extension of the central openings or bores 32 and 38, with their central openings or bores 45 and 46, respectively. The valve guides 41 and 42 also complete the full length area established by the longitudinal bore 17. The valve guides 41 and 42, in their areas adjacent to the valve guides 27 and 28, respectively, are provided with cut-away portions 43 and 44, respectively. The cut-away portions 43 and 44 provide peripheral fluid flow areas and are connected to the openings or bores 45 and 46 by radial openings 47 and 48, respectively.

It is pointed out at this time that the middle cylindrical opening formed by the adjacent central openings or bores 31, 22 and 37 is of a smaller diameter than the cylindrical openings formed by the central openings or bores 32 and 45, positioned on one side of the middle cylindrical opening; and the central cylindrical opening formed by the bores 38 and 46, positioned on the other side of the middle cylindrical opening.

Positioned within the bore of the smaller diameter cylinder is a valve spool 49 having integral longitudinally extending arms 50 and 51. The spool 49 is of a length to exactly cover the radial openings 20. The arms 50 and 51 are positioned on opposite sides of the spool 49 and the outward ends of the arms 50 and 51 are provided with cone-shaped recesses 52 and 53, respectively. The purpose of these recesses will be explained hereinafter. Positioned in contact with the outer ends of the arms 50 and 51 are the valve spools 54 and 55, respectively. It is poined out at this time that the valve spools 54 and 55 are of greater diameter than the valve spool 49, the reason for this being pointed out in the operation which is to follow. The spools 54 and 55 are provided with openings 54a and 55a, respectively, with the opening 54a connecting the cone-shaped recess 52 with the radial openings 47; and the opening 55a connecting the cone-shaped opening 53 with the radial openings 48.

Since the end spools 54 and 55 are of a diameter greater than the central spool 49, it is necessary for the end spools 54 and 55 to be separate members in order to allow assembly. To provide for valve assembly operation as a single unit, the cone-shaped recesses 52 and 53 are provided with the openings 54a and 55a to pressure zones reduced in pressure to a level below those pressures surrounding the spools. This difference in pressure causes the spools to be held together and to operate as a unitary structure.

The peripheral opening formed by the cut-away portions 29 and 30 is connected to a fluid rotary vane power actuator 56 by a pipe 57. The peripheral opening formed by the cut-away portions 35 and 36 is also connected to the rotary vane power actuator 56 through a pipe 58.

The peripheral openings formed by the cut-away portions 43 and 44 are interconnected by a pipe 59 and then connected to a fluid return pipe 60.

The end caps 18 for the second stage body 16 are provided with central openings 61 and 62, with the opening 61 exhausting into the central bore 45 and the opening 62 exhausting into the central bore 46. The openings 61 and 62 are connected to the first stage controlled pressure supply pipes 9 and 10, respectively, as explained hereinbefore.

The spool valve assembly formed by the spools 49, 54 and 55 is provided with static opposing centering springs 63 and 64.

The following paragraphs contain a description of the rotary vane power actuator.

The power actuator 56 controlled by the previously described first and second stages, is a rotary vane type of actuator provided with a body portion 65 having a central generally circular opening 66 and a pair of opposing inwardly extending teeth 67 and 68. Positioned within the opening 66 and movable on a central shaft 69 is a rotary vane member 70 having integral outwardly extending teeth 71 and 72 positioned on opposing sides of the rotary vane member 70. The body member teeth 67 and 68 extend inwardly a sufficient distance to cooperate with the rotary vane member 70 and the rotary vane member teeth 71 and 72 extend outwardly to the walls of the central cylindrical opening 66. With the rotary vane member 70 rotated to a position in which the teeth 71 and 72 are positioned 90° from the teeth 67 and 68, the central opening 66 of the body 65 becomes divided into four chambers. These chambers are the chambers 66a, 66b, 66c and 66d. The second stage servo valve supply pipe 57 is connected to two of the four chambers, while the second stage pressure supply pipe 58 is connected to the other two of the four chambers as described hereinafter.

With the pressure supply pipe 57 connected into the chamber 66a and the pressure supply pipe 58 connected into the chamber 66b, it can be seen that the chambers 66c and 66d have no direct communication with the pipes 57 and 58. For this reason, the openings 73 and 74 interconnecting the chambers 66a with 66d and 66b with 66c, respectively, are provided. It can be seen, therefore, that fluid entering through the supply pipe 57 into the chambers 66a and 66d would caused rotation of the vane member 70 and its teeth 71 and 72 in a counterclockwise direction. This action is made with the assumption that fluid can flow out of the chambers 66b and 66c and into the tube 58. If increased fluid pressure, however, is introduced through the tube 58 into the chambers 66b and 66c and pressure is relieved from chambers 66a and 66d, it can be seen that clockwise rotation of the rotary vane would occur.

Since the rotary vane member is a work actuator, it is shown connected to a load 75 of any suitable type, usually inertial in character.

Operation of the servo valve will now be explained.

Under static conditions with no current being supplied to the winding 13 of the first stage, the pressures introduced into the pipes 9 and 10 will be of equal value as explained hereinbefore. With the pressures supplied to the second stage by the control pipes 9 and 10 being of equal value, and the springs 63 and 64 also being of equal value and opposing, it can be seen that the spool valve assembly will be centered with the spool 49 exactly covering the radial openings 20 and the spool 54 being exactly aligned with the right hand edge of the radial openings 47 and the spool 55 being exactly aligned with the left hand edge of the radial openings 48.

Under these conditions, no appreciable fluid flow will occur from the source pipes 8 and 21 through the openings 20 past the spool valve 49 and into the rotary vane actuator 56. However, due to necessary clearances within the valve, some seepage does take place and pressure will build up in the chambers of the rotary actuator. Since seepage also occurs past the end spool valves 54 and 55 into the return pipe 60, it has been found that the pressure within the rotary vane actuator under static conditions will be approximately one-half of that of the supply pressure introduced into the supply pipe 8. This is a desirable condition since it maintains an initial bias on the rotary actuator providing for a more rapid response to any change in pressures introduced by the first and second stages of the servo valve.

If we assume that a control current is supplied to the torque motor winding 13 of the first stage causing the control vane 11 to deflect to its left restricting the orifice 2 and relieving the orifice 3, it will be seen that the pressure within the supply pipe 9 for the second stage will increase while the pressure supplied to the second stage by the supply pipe 10 will decrease in an amount proportional to the amount of current supplied to the winding 13. This change of pressure supplied to the second stage causes pressure increase within the chamber formed by the central bore 45 and a decrease in the pressure within the chamber formed by the central bore 46. This causes a physical displacement of the spool valve assembly to the right, allowing supply fluid to flow more freely past the spool valve 49 into the chamber formed by the central bores 31 and 32 and outwardly through the pipe 57 into the chambers 66a and 66d of the rotary vane actuator. At the same time, the spool valve 55 opens the chambers 66b and 66c of the rotary vane actuator to the return pipe 60 through the pipe 58, the openings 39 and 40, the chamber formed by the bores 37 and 38, past the spool valve 55, through the openings 48 and into the return pipes 59 and 60. The introduction of increased fluid pressures to the chambers 66a and 66d of the rotary vane actuator 56 causes counterclockwise rotation of the rotary vane with nearly instantaneous response, since the rotary actuator is under an initial pressure.

Initial displacement of the spool valve assembly to the right is considered to be proportional to the current supplied to the winding 13 because of a linear force gradient due to the springs 63 and 64. As this displacement takes place, the pressure builds up in the chambers 66a and 66d and consequently, within the chamber formed by the bores 31 and 32. At the same time pressure reduction takes place within the chamber formed by the central bores 37 and 38. This increase in pressure within the chamber formed by the central bores 31 and 32 combined with the decrease in pressure within the chamber formed by the central bores 37 and 38 causes the spool valve assembly to move to its left, reducing the flow of fluid into the rotary actuator through the pipe 57. Return movement of the valve assembly to the left in opposition to the first stage supply control pressures takes place due to increased fluid pressure within the central bores 31 and 32 acting on the spool areas of the spools 49 and 54 and also due to decreased fluid pressure within the central bores 37 and 38 acting on the spool areas of the spools 49 and 55. Since the rotary actuator supply pressure, existing in chambers 66a and 66d and felt in the bores 31 and 32 through the pipe 57, is exerted against the spool 49, tending to displace it to the right, and against the spool 54 tending to displace it to the left, and the area of the spool 54 is greater than the area of the spool 49, the resultant force is in a direction to tend to cause the spool assembly to move to the left.

Similarly, the actuator chamber pressure existing in chambers 66d and 66c and felt in bores 37 and 38 through the pipe 58 is exerted against the spool 49, tending to displace it to the left and against the spool 55, tending to displace it to the right. Since the area of spool 55 is greater than the area of the spool 49, the resultant force is in a direction to tend to cause the spool assembly to move to the right. However, the pressure in actuator chambers 66a and 66d is greater than the pressure within chambers 66b and 66c due to the initially assumed spool displacement to the right; therefore, the net resultant force on the spool due to actuator chamber pressures is to the left, causing the spool assembly to move slightly to the left reducing the flow of fluid from the supply pipe 8 into the rotary actuator and also reducing the flow of fluid from the actuator to the return pipe 59. Reduction of flow in response to the difference in actuator chamber pressures causes a more gradual change in chamber pressure which prevents excessive storage of energy in the entrapped oil within the actuator chambers. As the actuator approaches the desired velocity, the difference in actuator chamber pressures is reduced due to diminished load acceleration, causing the spool to again move to the right to a position equivalent to the initially assumed displacement to the right. Thus, the rotary actuator approaches the desired velocity without overshoot.

In summation it can be seen that this increased buildup of actuator pressure against the differential land area of the spools 49 and 54 and the decrease of actuator pressure against the differential land areas of the spools 49 and 55, causing a reduction in control fluid in the rotary actuator, can be considered a pressure feedback against the spool value due to the rotary actuator's resistance to movement, causing the spool assembly to reduce its flow momentarily and prevent the rotary actuator from overshooting the desired velocity level.

Figure 2:
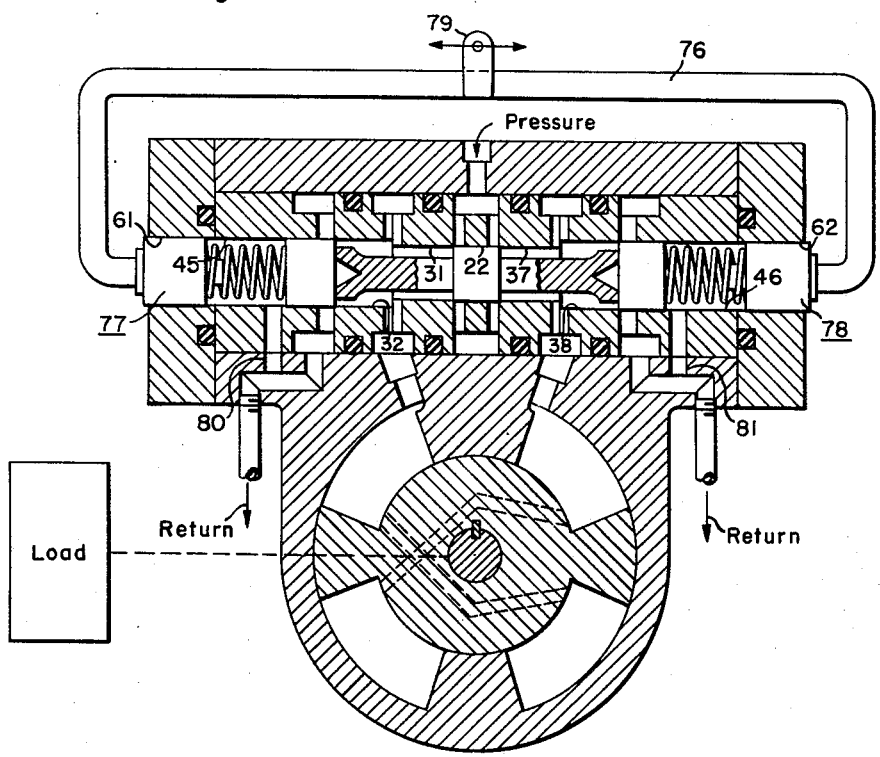
Fig. 2 is a view of another embodiment of this invention, partly sectioned to better illustrate the structure.

In the embodiment shown in Fig. 2, the previously described first stage of Fig. 1 has been replaced by a mechanical structure for displacing the valve member of the second stage.

The mechanical structure comprises an actuator arm 76 extending the length of the second stage, with its ends turned 180° forming an elongated C-shaped actuator. The ends of the actuator arm 76 are provided with pistons 77 and 78 positioned within and cooperating to seal the cylinder formed by the bores 22, 31, 32, 37, 38, 45 and 46 against fluid loss.

Located at some point along the length of the actuator arm 76, such as at its center as shown in the drawings, is an actuator lug 79. The lug is securely attached to the actuator arm 76 and is used to provide an attachment for an external control means (not shown) for selectively displacing the actuator arm in the directions shown by the arrows.

The structure of the second stage is similar to that previously described in connection with Fig. 1 with the exception of the introduction of mechanical displacement of the valve member through the biasing springs 63 and 64 positioned between the end pistons 77 and 78 of the valve member assembly. The end caps 18 are thus modified with enlarged center openings 61 and 62 to accommodate the end pistons. In addition, return passages 80 and 81 are provided to relieve any pressure changes occurring in the chambers formed by the actuator arm pistons 77 and 78, and the end spools 54 and 55 of the valve member assembly.

Operation of this embodiment is similar to that described in connection with Fig. 1, except that the first stage is now a mechanical mechanism causing second stage valve spool assembly displacement through changes in bias spring pressures upon movement of the actuator arm 78 in one direction or the other. In this modification the pressure feedback action is opposed by spring pressures alone and not fluid pressures or a combination thereof.

Further explanation of the operation of this embodiment is not deemed necessary since its operation is the same as the operation of Fig. 1 with the exception of the noted changes recited above.

Figure 3:
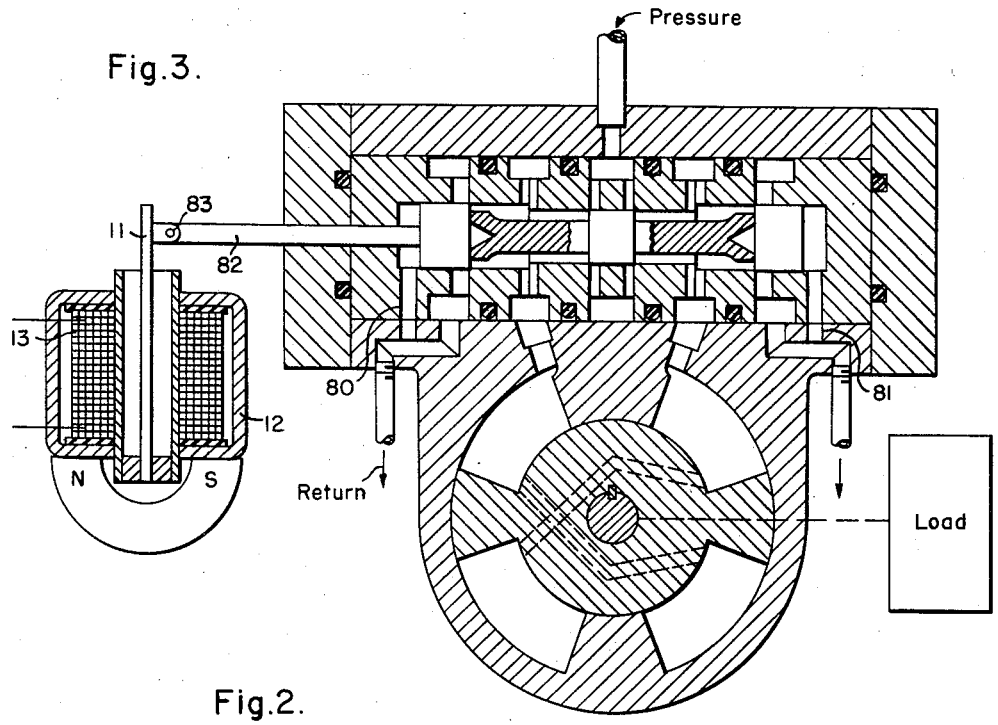
Fig. 3 is an elevational view of still another embodiment of this invention partly sectioned to better illustrate the structure.

The embodiment shown in Fig. 3 is the same as that shown in Fig. 1 with the exception that the torque motor vane 11 is connected directly to the spool valve assembly through the drive link 82 and pivot 83, and the vane itself acts as the centering bias means for the valve assembly, eliminating the need for additional centering springs. To avoid interference with valve assembly movement, the return relief passages 80 and 81 are provided for the areas between the end spools 54 and 55 and end caps 18.

Operation of this embodiment (shown in Fig. 3) is substantially the same as the operation set forth in Fig. 1, except for the fact that the torque motor vane is mechanically connected to the spool valve assembly and thus directly displaces the assembly upon the introduction of current into the winding 13.

The use of the type of spool valve having pressure feedback provides good rotary actuator control without the disadvantage of overcontrol and the resulting undesirable hunting. For this reason this servo valve and rotary actuator combination can be used within a closed loop system without the danger of overcontrol and instability.

The invention is not to be restricted to the specific structural details or arrangement of parts herein set forth, as various modifications thereof may be effected without departing from the spirit and scope of this invention.

I claim as my invention:

A servo device comprising, a first stage fluid pressure controller producing a pair of oppositely variable fluid output pressures, control valve means comprising a pressure responsive movable valve member connected to said first stage fluid pressure controller to respond to the differential of said oppositely variable fluid output pressures, said valve member comprising a center spool and a pair of end spools having an area differential with respect to said center spool, said valve means also having a pair of oppositely variable fluid pressure ports controlled by said valve member, an inertial fluid pressure operated actuator connected to said fluid pressure ports for reversible operation, and pressure feedback means for controlling said valve member for preventing oscillations of said fluid pressure actuator, said pressure feedback means comprising direct fluid pressure actuator supplied pressure application on said differential area between said center spool and one of said pair of end spools of said valve member causing valve member movement in opposition to initial movement.

References Cited in the file of this patent

UNITED STATES PATENTS

| | | |
|---|---|---|
| 2,020,041 | Rockcastle et al. | Nov. 5, 1935 |
| 2,140,037 | Swisher | Dec. 13, 1938 |
| 2,210,917 | Kenyon et al. | Aug. 13, 1940 |
| 2,283,753 | Harcum | May 19, 1942 |
| 2,370,137 | Biggert | Feb. 27, 1945 |
| 2,400,126 | Matthews | May 14, 1946 |
| 2,466,041 | Peoples et al. | Apr. 5, 1949 |
| 2,526,709 | Tait | Oct. 24, 1950 |
| 2,570,624 | Wyckoff | Oct. 9, 1951 |
| 2,738,772 | Richter | Mar. 20, 1956 |
| 2,767,689 | Moog | Oct. 23, 1956 |